United States Patent
Kagata et al.

[11] Patent Number: 5,484,753
[45] Date of Patent: Jan. 16, 1996

[54] DIELECTRIC CERAMIC COMPOSITIONS

[75] Inventors: Hiroshi Kagata, Neyagawa; Junichi Kato, Osaka; Tatsuya Inoue, Takatsuki; Ichiro Kameyama, Takatsuki; Keiji Nishimoto, Takatsuki, all of Japan

[73] Assignee: Matsushita Electric Industrial Co., Ltd., Osaka, Japan

[21] Appl. No.: 386,459

[22] Filed: Feb. 10, 1995

[30] Foreign Application Priority Data

Mar. 8, 1994 [JP] Japan ................... 6-037049

[51] Int. Cl.⁶ .................................. C04B 35/46
[52] U.S. Cl. .......................... 501/136; 501/135
[58] Field of Search ...................... 501/135, 136, 501/63, 68, 69, 70, 32

[56] References Cited

U.S. PATENT DOCUMENTS

| | | | |
|---|---|---|---|
| 4,242,213 | 12/1980 | Tamura et al. | 106/73.3 |
| 4,506,026 | 3/1985 | Hodgkins et al. | 501/135 |
| 5,147,835 | 9/1992 | Franzak et al. | 501/134 |
| 5,292,694 | 3/1994 | Abe et al. | 501/139 |

FOREIGN PATENT DOCUMENTS

| | | |
|---|---|---|
| 8402521 | 7/1984 | European Pat. Off. . |
| 0534801 | 7/1992 | European Pat. Off. . |
| 0582274 | 2/1994 | European Pat. Off. . |

OTHER PUBLICATIONS

Database WPI; Week 8831; Derwent Publications Ltd., London, GB; AN 88–216279 & JP-A-06 315 168 (Murata Mfg Co), 24 Jun. 1988 * abstract *.
Database WPI; Week 9222; Derwent Publications Ltd., London, GB; AN 92–180582 & JP-A-04 118 807 (Sanyo Electric Co.), 20 Apr. 1992 * abstract *.
Database WPI; Week 9233; Derwent Publications Ltd., London, GB; AN 92–274267 & JP-A-04 188 506 (Matsushita), 7 Jul. 1992 * abstract *.

*Primary Examiner*—Deborah Jones
*Attorney, Agent, or Firm*—Fish & Richardson

[57] ABSTRACT

This invention provides a dielectric ceramic composition which has a high dielectric constant and a high Q value, and also has lower temperature coefficient of resonance frequency. The dielectric ceramic composition is attained by sintering composition which comprises a first component from 40 to 98 wt % and a second component from 2 to 60 wt %. The first component is represented by the following formula, $$Ca\{(Mg_{1/3}Nb_{2/3})_{1-x}Ti_x\}O_3$$

where $0 \leq x \leq 0.50$. The second component includes at least one element selected from the group consisting of $SiO_2$ and $B_2O_3$.

8 Claims, 4 Drawing Sheets

DIELECTRIC CERAMIC COMPOSITIONS

FIELD OF THE INVENTION

This invention relates to dielectric ceramic compositions which are used for filters and resonant devices that operate in the microwave region.

BACKGROUND OF THE INVENTION

Recently, along with the advancement in communication using electromagnetic waves in the microwave frequency region, for example, in automobile telephones, in portable telephones, or in satellite broadcasts, the terminal apparatus is required to be smaller. In order to attain this goal, each component comprising the terminal apparatus must be miniaturized. In those apparatus, a dielectric ceramic is inserted in filters or in resonant devices. When using the same resonance mode, the size of the dielectric resonator is inversely proportional to the square root of the dielectric constant ($\epsilon_r$) attributed to the dielectric material. Therefore, a material having a high dielectric constant is needed to manufacture a compact-sized dielectric resonator. In addition, the dielectric material for the dielectric resonator must have low loss in the microwave region. In other words, the dielectric material must have a high Q value and a low temperature coefficient ($\tau_f$) of a resonance frequency. Q value means reciprocal of dielectric loss tan δ.

As materials with a high dielectric constant, (Pb,Ca) $ZrO_3$ are disclosed in Published Examined Japanese Patent Application No. (Tokkai Hei) 4-65021. These materials have high dielectric constants over 100, high Q values of about 800 in 2–4 GHz, and lower temperature coefficients of resonance frequencies.

On the other hand, conductors and dielectric ceramics are laminated to miniaturize a resonant device. The conductor should have a higher conductivity when used in a high frequency (e.g. microwave) region. Therefore Cu, Au, Ag, or alloys of such metals should be used. These metals must be sintered carefully in a condition where the metal of the conductor does not melt or oxize, because the dielectric ceramic need to be fired carefully along with the metal conductors to be laminated. The material must be fired at lower temperatures (for Cu, at 1083° C. or less; Au, at 1063° C. or less; Ag, at 961° C. or less), and when using Cu for an electrode, the partial pressure of oxygen should be lower. $Bi_2O_3$—$CaO$—$Nb_2O_5$ has been disclosed in U.S. Pat. No. 5,273,944, as a microwave dielectric ceramic.

Though the above-mentioned ceramic made of $Bi_2O_3$—$CaO$—$Nb_2O_5$ can be sintered at about 1000° C., the first component ($Bi_2O_3$) evaporates when fired. Thus the dielectric properties, with regard to the firing temperature, are unstable.

SUMMARY OF THE INVENTION

It is an object of this invention to solve the above-mentioned problems by providing dielectric ceramic compositions that do not contain $Bi_2O_3$ as the first components and which can be sintered at a lower temperature. In addition, they have high dielectric constants and high Q values, and also satisfy the requirement of a lower temperature coefficient of a resonance frequency.

In order to accomplish these and other objects and advantages, a first embodiment of the dielectric ceramic compositions of this invention shown in the following formula comprises as the first component calcium oxide, magnesium oxide, niobium oxide, titanium oxide, $$Ca\{(Mg_{1/3}Nb_{2/3})_{1-x}Ti_x\}O_3$$

wherein $0 \leq x \leq 0.50$. The dielectric ceramic composition comprises as a second component at least one element selected from the group consisting of $SiO_2$ and $B_2O_3$. The first component is present in an amount of from 40 to 98 weight percent (wt %), and the second component is present in an amount of from 2 to 60 wt %.

It is preferable in this invention that the second component comprises $SiO_2$ in an amount of from 30 to 65 wt %, $B_2O_3$ in an amount of from 10 to 35 wt %, $Al_2O_3$ in an amount of from 5 to 30 wt %, $ZrO_2$ in an amount of from 0 to 8 wt %, and MO in an amount of from 0 to 13 wt %, where M is at least one element selected from the group consisting of Ca, Sr, and Ba.

Also, it is preferable that the second component contains at least one oxide selected from the group consisting of $Li_2O$, $Na_2O$, $K_2O$, PbO, and ZnO in the amount of 0 to 3 wt %.

Furthermore, it is preferable in this invention that the dielectric constant ($\epsilon_r$) of the dielectric ceramic composition is from 14 to 40, Qf product is from 1000 to 30000 GHz, and the temperature coefficient ($\tau_f$) of the resonance frequency is from −50 to +50 ppm/°C.

Next, a second embodiment of the dielectric ceramic compositions of the invention comprises calcium oxide, magnesium oxide, niobium oxide, and titanium oxide as the first component shown in the following formula, $$Ca\{Mg_{1/3}Nb_{2/3})_{1-x}Ti_x\}O_3$$

wherein $0 \leq x \leq 0.50$. In the second embodiment, aluminum oxide is also comprised in the first component. The dielectric ceramic composition comprises at least one element selected from the group consisting of $SiO_2$ and $B_2O_3$ as a second component. The first component is present in an amount of from 30 to 98 wt %, and the second component is present in an amount of from 2 to 70 wt %.

It is preferable in this invention that the second component comprises $SiO_2$ in an amount of from 30 to 65 wt %, $B_2O_3$ in an amount of from 10 to 35 wt %, $Al_2O_3$ in an amount of from 5 to 30 wt %, $ZrO_2$ in an amount of from 0 to 8 wt %, and MO in an amount of from 0 to 13 wt %, where M is at least one element selected from the group consisting of Ca, Sr, and Ba, because when the second component is fired to be glass, the melting point can be lowered.

Also it is preferable that the second component contains at least one oxide selected from the group consisting of $Li_2O$, $Na_2O$, $K_2O$, PbO, and ZnO, and the oxide is present in an amount of from 0 to 3 wt %.

It is preferable in this invention that the dielectric constant ($\epsilon_r$) of the dielectric ceramic composition is from 9 to 24, Qf product is from 1000 to 30000 GHz, and the temperature coefficient ($\tau_f$) of the resonance frequency is from −50 to +50 ppm/°C.

The dielectric ceramic composition of the first embodiment of this invention comprises $Ca\{(Mg_{1/3}Nb_{2/3})_{1-x}Ti_x\}O_3$ as the first component which has a high dielectric constant and superior microwave dielectric properties, where $0 \leq x \leq 0.50$. As the second component, glass promotes sintering. Thus the dielectric ceramic of the invention sinters at about 1000° C., and it has a high dielectric constant, a high Q value, and a low temperature coefficient of resonance frequency. Also, the dielectric ceramic composition does not comprise $Bi_2O_3$ as the first component, so that it is stable in dielectrtic properties relative to the firing temperature.

The dielectric ceramic composition of the second embodiment of this invention preferably comprises aluminum oxide as a first component because it has a lower dielectric constant. Thus it is possible to control dielectric constant without sacrificing sintering temperature, Q value, or temperature coefficient. Furthermore, glass is added as the second component of the embodiment. Thus the dielectric ceramic of the invention sinters at about 1000° C., and it has a high dielectric constant, a high Q value, and a low temperature coefficient of resonance frequency.

Furthermore, it is preferable that the dielectric ceramic compositions of the first and the second embodiments comprise $SiO_2$ from 30 to 65 wt %, $B_2O_3$ from 10 to 35 wt %, $Al_2O_3$ from 5 to 30 wt %, $ZrO_2$ from 0 to 8 wt %, and MO from 0 to 13 wt %, where M is at least one element selected from the group consisting of Ca, St, and Ba. Such dielectric ceramic compositions can be sintered at a lower temperature, and have a high dielectric constant, a high Qf product, and a low temperature coefficient of resonance frequency. In other words, they have excellent microwave dielectric properties.

Also, it is preferable that the second component contains at least one oxide selected from $Li_2O$, $Na_2O$, $K_2O$, PbO, and ZnO in the amount of 0 to 3 wt %. Such dielectric ceramic compositions can be sintered at a relatively low temperature, and have a high dielectric constant, a high Qf product, and a low temperature coefficient of resonance frequency. In other words, they have excellent microwave dielectric properties.

Furthermore, it is preferable in the dielectric ceramic compositions of this invention that the dielectric constant ($\epsilon_r$) is from 14 to 40, Qf product is from 1000 to 30000 GHz, and the temperature coefficient ($\tau_f$) of the resonance frequency is from −50 to +50 ppm/°C. It is further preferable that the dielectric constant ($\epsilon_r$) is from 9 to 24, Qf product is from 1000 to 30000 GHz, and the temperature coefficient ($\tau_f$) of the resonance frequency is from −50 to +50 ppm/°C. Such dielectric ceramic compositions can be applied to multilayer microwave resonant devices. As a result, high-frequency devices like filters and duplexers can have a compact size and high performance.

Furthermore the dielectric ceramic compositions of this invention can be applied to multilayer microwave resonant devices using metals like Au, Ag, or Cu as inner conductors. As a result, high-frequency devices like filters and duplexers can be miniaturized and have excellent performance.

DETAILED DESCRIPTION OF THE INVENTION

Figure 1:
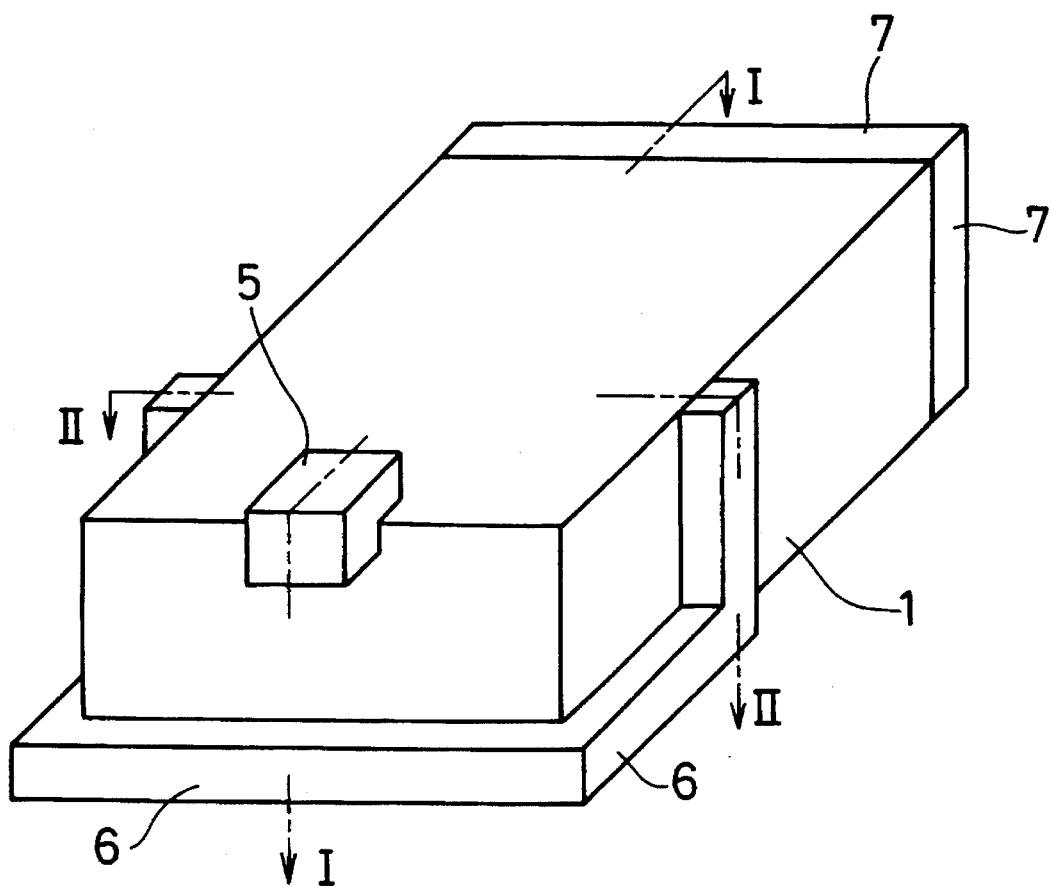
FIG. 1 is a perspective view of a multilayer microwave resonant device using dielectric compositions of one embodiment of the invention.

This invention will be described by referring to the following examples and attached figures. The examples are not intended to limit the invention in any way.

Example 1

Example 1 is an example of the first embodiment of this invention.

Starting materials used for the first component were $CaCO_3$, MgO, $Nb_2O_5$, and $TiO_2$ of high chemical purity (99 wt % or more). After the materials were purified, the composition was weighed so that x in the formula $Ca\{(Mg_{1/3}Nb_{2/3})_{1-x}Ti_x\}O_3$ could be predetermined. Then the powders of the above-mentioned materials were mixed with pure water and zirconia balls by using a ball mill for 17 hours. The mixed slurry was dried and calcined in an alumina crucible for 2 hours at 1000° to 1300° C. The calcination product was crushed and then pulverized in the ball mill for 17 hours, then dried to produce a powder of the first component.

Powders to be used as the second component were produced as follows. Starting materials were $SiO_2$, $B_2O_3$, $Al_2O_3$, $ZrO_2$, $BaCO_3$, $SrCO_3$, $CaCO_3$, $Li_2O$, ZnO and PbO of high chemical purity (99 wt % or more). After being purified, the materials were weighed so as to make the various compositions shown in Table 1, and mixed with ethanol as a solvent by using a ball mill and then dried. The mixed slurry was melted in a crucible at a temperature from 1000° to 1200° C., and quenched. After being crushed, the product was pulverized by using the ball mill, then dried. The composition of the second component is shown in Table 1.

TABLE 1

| No. | Composition of second component (wt %) | | | | | | | | | |
|---|---|---|---|---|---|---|---|---|---|---|
| | $SiO_2$ | $B_2O_3$ | $Al_2O_3$ | $ZrO_2$ | BaO | SrO | CaO | $Li_2O$ | ZnO | PbO |
| A | 50 | | | | 20 | | | 10 | | 20 |
| B | | 60 | | | | | | | 10 | 20 |
| C | 50 | 30 | 20 | | | 10 | | | | |
| D | 45 | 27 | 20 | 3 | 5 | | | | | |

TABLE 1-continued

| | Composition of second component (wt %) | | | | | | | | | |
|---|---|---|---|---|---|---|---|---|---|---|
| No. | SiO$_2$ | B$_2$O$_3$ | Al$_2$O$_3$ | ZrO$_2$ | BaO | SrO | CaO | Li$_2$O | ZnO | PbO |
| E | 45 | 26 | 20 | 3 | | | 5 | 1 | | |

The powders of the first component and second component were wet-mixed in a ball mill and dried. Next, after adding 6 wt % of 5 wt % of aqueous solution made of polyvinyl alcohol into this powder as a binder, it was mixed, granulated through a 32 mesh screen and press-molded with 100 MPa into a cylindrical shape of 13 mm in diameter and about 5 mm in thickness. The pressed body was heated at a temperature of 600° C. for 3 hours, and when the binder was burnt, the pressed body was put into a magnesia vessel, lidded and fired at various temperatures of from 800° to 1400° C. for 2 hours. A sintered body, which was fired at a temperature at which the density reached the highest value, was measured with respect to dielectric properties in the microwave region. Resonance frequency and Q value were measured by dielectric resonator method. Dielectric constant ($\epsilon_r$) was calculated by the size of the sintered body and the resonance frequency. The resonance frequency was from 4 to 8 GHz. Furthermore, resonance frequencies at −25° C., 20° C., and 85° C. were measured, and the temperature coefficient of the resonance frequencies ($\tau_f$) were calculated by the values using the method of least squares. The results are shown in Table 2. In Table 2, Qf product is the product of the Q value and frequency (f) measured. The frequency (f) varies in from 4 to 8 GHz, according to sizes and shapes of the samples. Therefore Qf product was used to calculate without being influenced by the sizes or shapes of the samples. This method is well known to those of ordinary skill in the art.

($\tau_f$) are from −41 to +48 ppm/°C. Thus it was confirmed that the ceramic compositions have excellent microwave dielectric properties. With respect to second components, as shown in Samples Nos. 10 to 13, the various components were excellent in dielectric properties. As a result, it was demonstrated that at least either SiO$_2$ or B$_2$O$_3$ should be included in the composition.

As shown in Sample No.4, if x in the formula Ca{(Mg$_{1/3}$Nb$_{2/3}$)$_{1-x}$Ti$_x$}O$_3$, which represents the first component, is over 0.5, it becomes unpractical because the temperature coefficient of the resonance frequency becomes larger than +50 ppm/°C. As shown in Sample No.5, if the quantity of the second component is less than 2 wt %, the purpose of the invention cannot be obtained because firing temperature is 1400° C. As shown in Sample No.9, if the quantity of the second component is over 60 wt %, it is undesirable because the Qf product becomes 1000 GHz or less.

Example 2

Example 2 is a preferable example of the first embodiment of this invention.

Samples were prepared and their properties were varied in accordance with Example 1. Only the second components were replaced by those shown in Table 3. The results are shown in Table 4.

TABLE 2

| | Composition | | | | | Dielectric properties | | |
|---|---|---|---|---|---|---|---|---|
| Sample | first component | | second component | | Sintering temperature | | Qf product | τf |
| No. | x | wt (%) | type | wt (%) | °C. | εr | GHz | ppm/°C. |
| 1 | 0.0 | 80 | D | 20 | 900 | 14 | 4500 | −41 |
| 2 | 0.3 | 80 | D | 20 | 900 | 22 | 3800 | −3 |
| 3 | 0.5 | 80 | D | 20 | 900 | 29 | 2400 | +48 |
| 4# | 0.55 | 80 | D | 20 | 900 | 32 | 1800 | +79 |
| 5# | 0.3 | 100 | D | 0 | 1400 | 42 | 34000 | −12 |
| 6 | 0.3 | 98 | D | 2 | 1150 | 40 | 18000 | −10 |
| 7 | 0.3 | 70 | D | 30 | 875 | 19 | 2900 | −8 |
| 8 | 0.3 | 40 | D | 60 | 850 | 14 | 1200 | −7 |
| 9# | 0.3 | 30 | D | 70 | 850 | 12 | 400 | −7 |
| 10 | 0.3 | 80 | A | 20 | 1075 | 23 | 4100 | +2 |
| 11 | 0.3 | 80 | B | 20 | 875 | 20 | 2700 | +4 |
| 12 | 0.3 | 80 | C | 20 | 950 | 23 | 3900 | −2 |
| 13 | 0.3 | 80 | E | 20 | 875 | 22 | 3700 | −5 |

The numbers followed by a # show comparative examples.

As shown in Table 2, it was confirmed that the ceramic compositions of this Example are sinterable at temperatures from 850° to 1150° C., in which the dielectric constants ($\epsilon_r$) are from 14 to 40, the Qf products are from 1200 to 18000 GHz, the temperature coefficients of resonance frequency

TABLE 3

| No. | SiO₂ | B₂O₃ | Al₂O₃ | ZrO₂ | BaO | SrO | CaO |
|---|---|---|---|---|---|---|---|
| F | 45 | 27 | 20 | 3 | 5 | | |
| G | 55 | 20 | 15 | 4 | | 6 | |
| H | 35 | 30 | 25 | 6 | 1 | | 1 |
| I | 25 | 35 | 30 | 4 | 3 | 3 | |
| J | 70 | 15 | 10 | 2 | 3 | | |
| K | 60 | 7 | 30 | 3 | | | 5 |
| L | 35 | 40 | 17 | 3 | | 5 | |
| M | 60 | 27 | 2 | 5 | 3 | 3 | |
| N | 40 | 20 | 35 | 2 | | 1 | 2 |
| O | 45 | 20 | 20 | 10 | 5 | | |
| P | 40 | 25 | 17 | 3 | | 5 | 10 |

Sample No.20 comprises second component I in which SiO₂ is less than 30 wt %. Sample No.23 comprises second component L in which B₂O₃ is more than 35 wt %. Sample No.24 comprises second component M in which Al₂O₃ is less than 5 wt %. These samples were not preferable because Qf products become smaller than 1000 GHz. Sample No.21 comprises second component J in which SiO₂ is more than 65 wt %. Sample No.22 comprises second component K in which B₂O₃ is less than 10 wt %. Sample No.25 comprises second component N in which Al₂O₃ is more than 30 wt %. Sample No.26 comprises second component O in which ZrO₂ is more than 8 wt %. Also, Sample No. 27 comprises second component P in which MO is more than 13 wt %, where M is at least one element selected from the group consisting of Ca, Sr, and Ba. These samples were not preferable embodiments because the firing temperatures were 1100° C. or more.

TABLE 4

| Sample No. | Composition first component x | first component wt % | second component type | second component wt % | Sintering temperature °C. | $\epsilon_r$ | Qf product GHz | $\tau_f$ ppm/°C. |
|---|---|---|---|---|---|---|---|---|
| 14 | 0.3 | 80 | F | 20 | 900 | 22 | 3800 | −3 |
| 15 | 0.3 | 80 | G | 20 | 950 | 24 | 4000 | −2 |
| 16 | 0.3 | 65 | G | 35 | 875 | 19 | 3300 | −5 |
| 17 | 0.45 | 65 | G | 35 | 875 | 23 | 2800 | +41 |
| 18 | 0.3 | 90 | H | 10 | 900 | 33 | 5100 | −10 |
| 19 | 0.3 | 80 | H | 20 | 875 | 21 | 3100 | −4 |
| 20# | 0.3 | 90 | I | 10 | 950 | 32 | 500 | −10 |
| 21# | 0.3 | 60 | J | 40 | 1100 | 20 | 2900 | −7 |
| 22# | 0.3 | 60 | K | 40 | 1125 | 21 | 3100 | −3 |
| 23# | 0.3 | 90 | L | 10 | 925 | 31 | 200 | −11 |
| 24# | 0.3 | 80 | M | 20 | 950 | 22 | 400 | −3 |
| 25# | 0.3 | 60 | N | 40 | 1150 | 19 | 1900 | −1 |
| 26# | 0.3 | 55 | O | 45 | 1125 | 17 | 1700 | +1 |
| 27# | 0.3 | 60 | P | 40 | 1125 | 17 | 2000 | +2 |

The numbers followed by a # show examples that are within the scope of claim 1, but not within the scope of the preferred embodiment of claim 2.

As shown in Table 4, dielectric ceramic compositions within the scope of claim 2 are sinterable at the temperatures from 875° to 950° C., and the dielectric constants ($\epsilon_r$) are from 21 to 33, the Qf products are from 2800 to 5100 GHz, the temperature coefficients of the resonance frequency ($\tau_f$) are from −10 to +41 ppm/°C. In other words, the dielectric ceramic compositions have superior microwave dielectric properties.

Example 3

Example 3 is an example of the second embodiment of this invention.

Samples were prepared and their properties were varied in accordance with Example 1. The first component of Example 3 comprises not only Ca{(Mg₁/₃Nb₂/₃)₁₋ₓTiₓ}O₃ but also Al₂O₃. Only the second components were replaced by those shown in Table 1. The results are shown in Table 5.

TABLE 5

| Sample No. | first component x | first component w | first component wt % | second component type | second component wt % | Sintering temp. °C. | $\epsilon_r$ | Qf product GHz | $\tau_f$ ppm/°C. |
|---|---|---|---|---|---|---|---|---|---|
| 28 | 0.3 | 0 | 80 | E | 20 | 875 | 22 | 3700 | −5 |
| 29 | 0.3 | 10 | 80 | E | 20 | 875 | 21 | 3800 | −7 |
| 30 | 0.3 | 50 | 80 | E | 20 | 900 | 16 | 4100 | −11 |
| 31 | 0.3 | 50 | 80 | A | 20 | 1000 | 18 | 4300 | −10 |
| 32 | 0.3 | 50 | 80 | C | 20 | 950 | 17 | 4200 | −8 |
| 33# | 0.3 | 60 | 100 | E | 0 | no sinter | | | |
| 34 | 0.3 | 60 | 98 | E | 2 | 1150 | 24 | 12000 | −14 |
| 35 | 0.3 | 60 | 80 | E | 20 | 900 | 13 | 4400 | −13 |
| 36 | 0.3 | 60 | 45 | E | 55 | 875 | 11 | 2800 | −11 |
| 37 | 0.3 | 60 | 60 | E | 70 | 850 | 9 | 1400 | −10 |
| 38# | 0.3 | 60 | 25 | E | 75 | 850 | 8 | 500 | −8 |

TABLE 5-continued

| Sample No. | Compositions | | | | | Sintering temp. °C. | Dielectric properties | | |
|---|---|---|---|---|---|---|---|---|---|
| | first component | | | second component | | | | Qf product | τf |
| | x | w | wt % | type | wt % | | $\epsilon_r$ | GHz | ppm/°C. |
| 39 | 0.3 | 80 | 80 | E | 20 | 950 | 11 | 6000 | −22 |
| 40# | 0.3 | 100 | 80 | E | 20 | 1050 | 7 | 8100 | −55 |
| 41 | 0.3 | 50 | 80 | E | 20 | 900 | 21 | 3000 | +46 |
| 42# | 0.55 | 50 | 80 | E | 20 | 900 | 23 | 2400 | +70 |

The numbers followed by a # show comparative examples.
"w" in the column of compositions is weight percent of $Al_2O_3$ in the first components.

As shown in Table 5, it was confirmed that the dielectric ceramic compositions of this example are sinterable at a temperature from 850° to 1150° C., in which the dielectric constants ($\epsilon_r$) are from 9 to 24, the Qf products are from 1400 to 12000 GHz, the temperature coefficients of the resonance frequency ($\tau_f$) are from −22 to +46 ppm/°C. Thus, the dielectric ceramic compositions have superior microwave dielectric properties. The dielectric constant can be lowered by increasing the amount of $Al_2O_3$ (w) which is included in the first component.

Sample No.33 comprising the second component at less than 5 wt % does not sinter at 1400° C. or less. Sample No.38 comprising the second component at more than 70 wt % is not satisfactory because the Qf product becomes smaller than 1000 GHz. Sample No.40 comprising only $Al_2O_3$ as the first component is not satisfactory because the temperature coefficient of the resonance frequency is less than −50 ppm/°C. In the case of Sample No.42, in which x in the formula $Ca\{(Mg_{1/3}Nb_{2/3})_{1-x}Ti_x\}O_3$ is over 0.5, the sample becomes unpractical because the temperature coefficient of the resonance frequency is over +50 ppm/°C.

Example 4

Example 4 is a preferable example of the second embodiment of this invention.

Samples were prepared and their properties were varied in accordance with Example 1. Only second components were replaced by those shown in Table 3. The results are shown in Table 6.

TABLE 6

| Sample No. | Composition | | | | | Sintering temp. °C. | Dielectric properties | | |
|---|---|---|---|---|---|---|---|---|---|
| | first component | | | second component | | | | Qf product | τf |
| | x | w | wt % | type | wt % | | $\epsilon_r$ | GHz | ppm/°C. |
| 43 | 0.3 | 50 | 80 | F | 20 | 900 | 16 | 4200 | −10 |
| 44 | 0.3 | 20 | 80 | G | 20 | 950 | 22 | 4000 | −4 |
| 45 | 0.3 | 50 | 80 | G | 20 | 975 | 18 | 4100 | −6 |
| 46 | 0.3 | 50 | 65 | G | 35 | 900 | 14 | 3600 | −8 |
| 47 | 0.45 | 50 | 65 | G | 35 | 875 | 17 | 3200 | +37 |
| 48 | 0.3 | 80 | 65 | G | 35 | 875 | 11 | 4100 | −16 |
| 49 | 0.3 | 50 | 90 | H | 10 | 900 | 24 | 5300 | −13 |
| 50 | 0.3 | 50 | 80 | H | 20 | 900 | 15 | 3300 | −8 |
| 51# | 0.3 | 50 | 90 | I | 10 | 950 | 23 | 400 | −13 |
| 52# | 0.3 | 50 | 60 | J | 40 | 1100 | 15 | 3300 | −9 |
| 53# | 0.3 | 50 | 60 | K | 40 | 1150 | 15 | 3600 | −7 |
| 54# | 0.3 | 50 | 90 | L | 10 | 925 | 23 | 300 | −15 |
| 55# | 0.3 | 50 | 80 | M | 20 | 950 | 16 | 400 | −6 |
| 56# | 0.3 | 50 | 60 | N | 40 | 1150 | 14 | 2000 | −6 |
| 57# | 0.3 | 50 | 55 | O | 45 | 1150 | 13 | 1900 | −2 |
| 58# | 0.3 | 50 | 60 | P | 40 | 1125 | 14 | 2500 | 0 |

The numbers followed by a # show examples that are within the scope of claim 5 but outside the preferred embodiment of claim 6.
"w" in the column of compositions is weight percent of $Al_2O_3$ in the first component.

As shown in Table 6, it was confirmed that dielectric ceramics of the preferred embodiment of claim 6 are sinterable at a temperature from 875° to 975° C., in which the dielectric constant ($\epsilon_r$) is from 11 to 22, the Qf product is from 3300 to 5300 GHz, and the temperature coefficient of the resonance frequency ($\tau_f$) is from −16 to +37 ppm/°C. Thus it was shown that the ceramic compositions have excellent microwave dielectric properties.

Sample No.51 comprises second component I in which $SiO_2$ is less than 30 wt %. Sample No.54 comprises second component L in which $B_2O_3$ is more than 35 wt %. Sample No.55 comprises second component M in which $Al_2O_3$ is less than 5 wt %. These samples were not preferable because Qf products become smaller than 1000 GHz. Sample No.52 comprises second component J in which $SiO_2$ is more than 65 wt %. Sample No.53 comprises second component K in which $B_2O_3$ is less than 10 wt %. Sample No.56 comprises second component N in which $Al_2O_3$ is more than 30 wt %. Sample No.57 comprises second component O in which $ZrO_2$ is more than 8 wt %. Also, Sample No. 58 comprises second component P in which MO is more than 13 wt %, where M is at least one element selected from the group consisting of Ca, Sr, and Ba. These samples were not preferable because the firing temperatures were 1100° C. or more.

In addition, it is also possible to include elements other than those shown in the examples, as long as they are within the scope of the invention and do not negatively affect dielectric properties.

Reference 1

Figure 2:
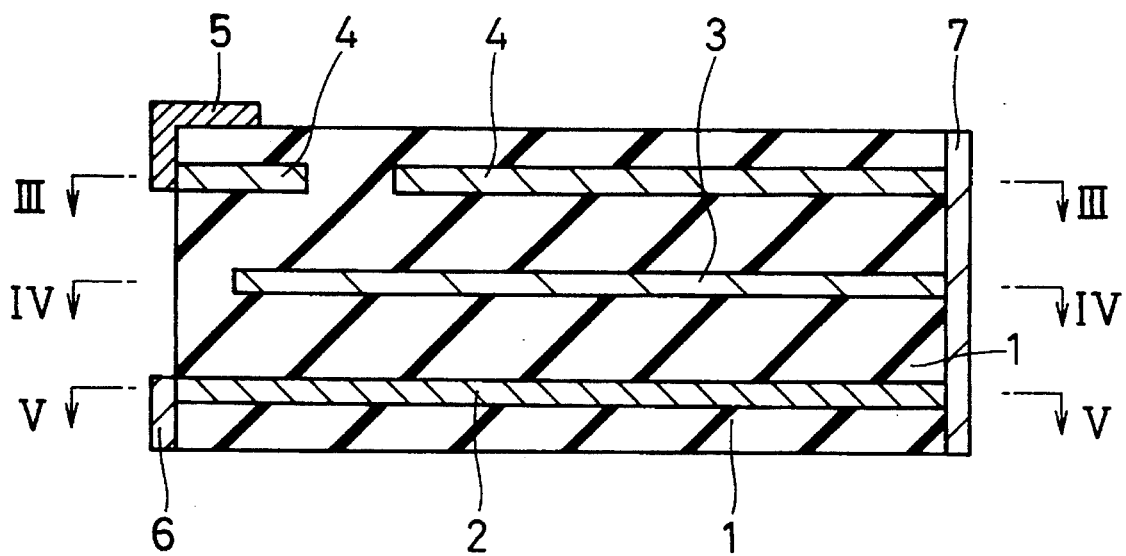
FIG. 2 is a cross-sectional view taken on line I—I of FIG. 1.
Figure 3:
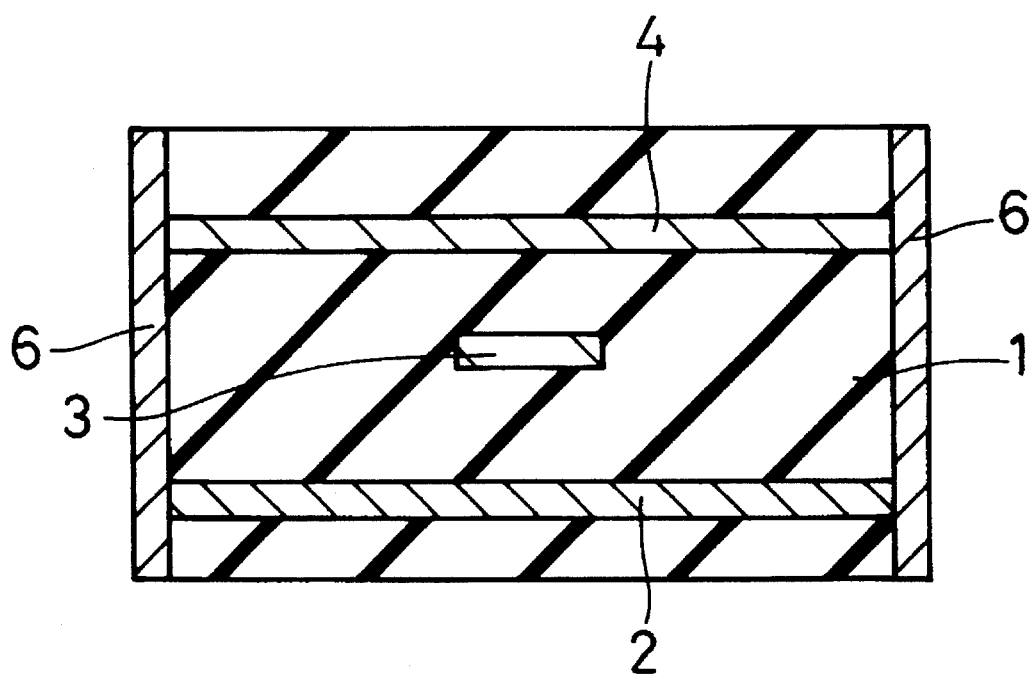
FIG. 3 is a cross-sectional view taken on line II—II of FIG. 1.
Figure 4A:
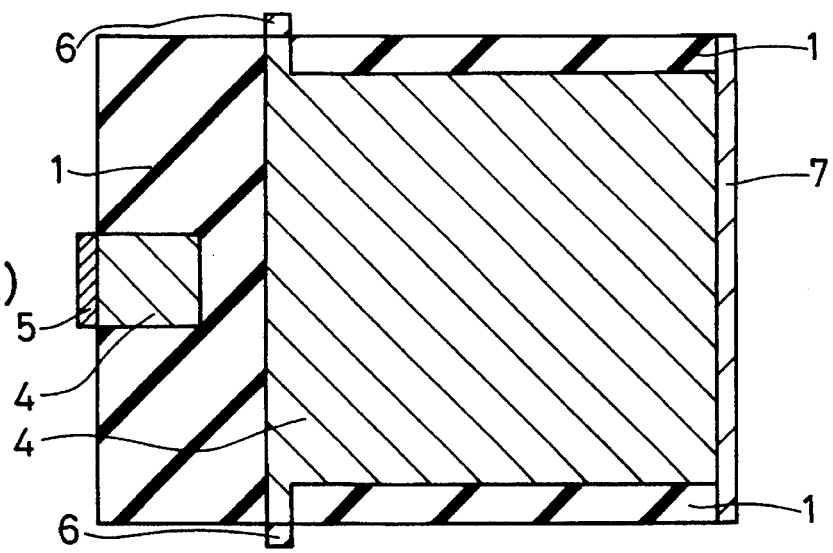
FIG. 4(a) is a cross-sectional view taken on line III—III of FIG. 2.
Figure 4B:
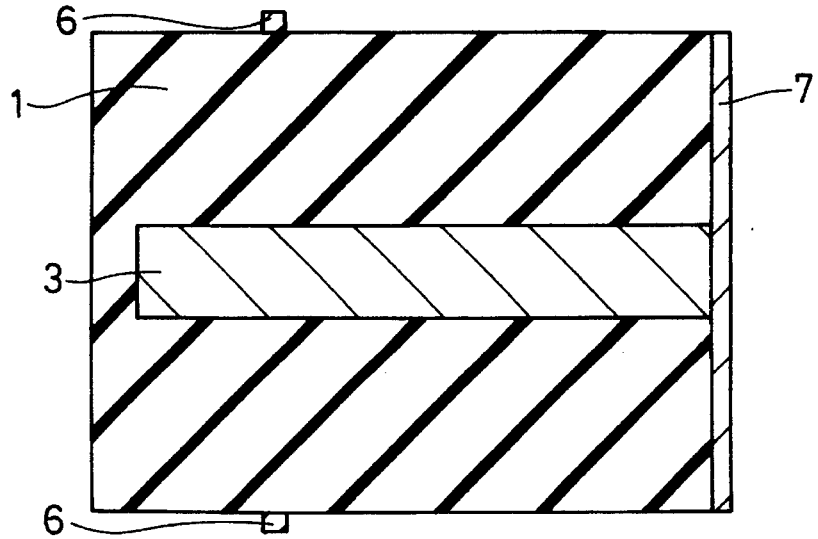
FIG. 4(b) is a cross-sectional view taken on line IV—IV of FIG. 2.
Figure 4C:
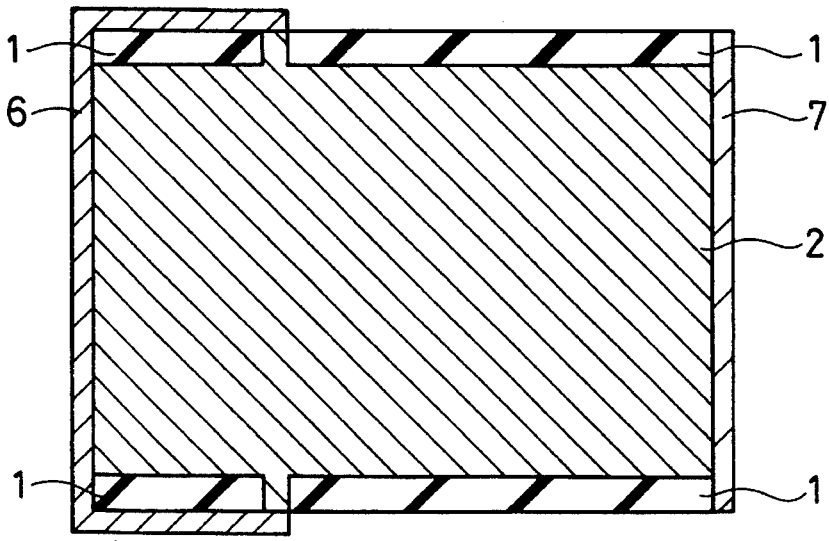
FIG. 4(c) is a cross-sectional view taken on line V—V of FIG. 2.

The following figures show one embodiment of a multilayer resonant device that employs a dielectric ceramic of the invention. FIG. 1 is a perspective view of a multilayer microwave resonant device using dielectric ceramic composition 1 of one embodiment of the invention. The device has inner conductors made of metals like Au, Ag, and Cu and also has outer conductors 5, 6, and 7. The multilayer microwave resonant device is 8 mm long, 5 mm wide and 2.5 mm high. FIG. 2 is a cross-sectional view taken on line I—I of FIG. 1. FIG. 3 is a cross-sectional view taken on line II—II of FIG. 1. FIG. 4(a) is a cross-sectional view taken on line III—III of FIG. 2. FIG. 4(b) is a cross-sectional view taken on line IV—IV of FIG. 2. FIG. 4(c) is a cross-sectional view taken on line V—V of FIG. 2. The figures show the arrangement of inner conductors made of metals like Au, Ag and Cu (2, 3, 4), and outer conductor 5 which are all attached to the dielectric ceramic composition 1. The inner conductor 3 is 1 mm wide, 7 mm long and 0.03 mm (30 μm) thick. The inner conductors 2 and 3 were formed by screenprint method. The area between the inner conductors 2 and 3 works as a capacitor. Microwaves are introduced into the resonant device via the capacitor. Then only some waves which have the predetermined frequency will resonate. In this way the resonant device functions.

As clearly described in the above-mentioned examples, a dielectric ceramic composition of this invention can be sintered at temperatures as low as 1000° C., and attain high Q values and small $\tau_f$ when the dielectric constants are as high as 15 or 25. Therefore this invention can be used in a multilayer resonant devices using metals like Cu, Au, or Ag as inner conductors. Consequently high-frequency devices like filters and duplexers can have a compact size and high performance. In addition, dielectric ceramics of this invention can be used not only for dielectric resonators, but also for microwave circuit substrates, multilayer ceramic capacitors etc, so that its industrial utility is high.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A dielectric ceramic composition comprising as a first component, a composition represented by the formula, $$Ca\{(Mg_{1/3}Nb_{2/3})_{1-x}Ti_x\}O_3$$

wherein $0 \leq x \leq 0.50$, and further comprising a second component which comprises at least one element selected from the group consisting of $SiO_2$ and $B_2O_3$, wherein the first component is present in an amount of from 40 to 98 wt %, and the second component is present in an amount of from 2 to 60 wt %.

2. The dielectric ceramic composition according to claim 1, wherein the second component comprises $SiO_2$ in an amount of from 30 to 65 wt %, $B_2O_3$ in an amount of from 10 to 35 wt %, $Al_2O_3$ in an amount of from 5 to 30 wt %, $ZrO_2$ in an amount of from 0 to 8 wt %, and MO in an amount of from 0 to 13 wt %, where M is at least one element selected from the group consisting of Ca, Sr, and Ba.

3. The dielectric ceramic composition according to claim 2, wherein the second component further comprises at least one oxide selected from the group consisting of $Li_2O$, $Na_2O$, $K_2O$, PbO and ZnO in an amount of from 0 to 3 wt %.

4. The dielectric ceramic composition according to claim 1, wherein the dielectric constant ($\epsilon_r$) is from 14 to 40, Qf product is from 1000 to 30000 GHz, and temperature coefficient of resonant frequency ($\tau_f$) is from −50 to +50 ppm/°C.

5. A dielectric ceramic composition comprising as a first component, $Al_2O_3$ and a composition represented by the formula, $$Ca\{(Mg_{1/3}Nb_{2/3})_{1-x}Ti_x\}O_3$$

wherein $0 \leq x \leq 0.50$, and further comprising a second component which comprises at least one element selected from the group consisting of $SiO_2$ and $B_2O_3$, wherein the first component is present in an amount of from 30 to 98 wt %, and the second component is present in an amount of from 2 to 70 wt %.

6. The dielectric ceramic composition according to claim 5, wherein the second component comprises $SiO_2$ in an amount of from 30 to 65 wt %, $B_2O_3$ in an amount of from 10 to 35 wt %, $Al_2O_3$ in an amount of from 5 to 30 wt %, $ZrO_2$ in an amount of from 0 to 8 wt %, and MO in an amount of from 0 to 13 wt %, where M is at least one element selected from the group consisting of Ca, Sr, and Ba.

7. The dielectric ceramic composition according to claim 6, wherein the second component further comprises at least one oxide selected from the group consisting of $Li_2O$, $Na_2O$, $K_2O$, PbO and ZnO in an amount of from 0 to 3 wt %.

8. The dielectric ceramic composition according to claim 5, wherein the dielectric constant ($\epsilon_r$) is from 9 to 24, Qf product is from 1000 to 30000 GHz, and temperature coefficient of resonance frequency ($\tau_f$) is from −50 to +50 ppm/°C.

* * * * *